(12) United States Patent
Igarashi et al.

(10) Patent No.: US 11,293,774 B2
(45) Date of Patent: Apr. 5, 2022

(54) NOTIFICATION CONTROL APPARATUS AND NOTIFICATION CONTROL METHOD

(71) Applicant: Mitsubishi Electric Corporation, Tokyo (JP)

(72) Inventors: Yuji Igarashi, Tokyo (JP); Yuko Ohta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 105 days.

(21) Appl. No.: 16/626,142

(22) PCT Filed: Jul. 19, 2017

(86) PCT No.: PCT/JP2017/026063
§ 371 (c)(1),
(2) Date: Dec. 23, 2019

(87) PCT Pub. No.: WO2019/016882
PCT Pub. Date: Jan. 24, 2019

(65) Prior Publication Data
US 2020/0166370 A1    May 28, 2020

(51) Int. Cl.
*G01C 21/36* (2006.01)
*G08G 1/0969* (2006.01)

(52) U.S. Cl.
CPC ..... *G01C 21/3667* (2013.01); *G01C 21/3682* (2013.01); *G01C 21/3694* (2013.01); *G08G 1/0969* (2013.01)

(58) Field of Classification Search
CPC ............ G01C 21/3667; G01C 21/3682; G01C 21/3694; G01C 21/34; G01C 21/3679; G08G 1/0969
See application file for complete search history.

(56) References Cited

U.S. PATENT DOCUMENTS 10,066,953 B2 *   9/2018   Ota ...................... G01C 21/26
10,248,128 B2 *   4/2019   Tanaka ................ G05D 1/0291
(Continued)

FOREIGN PATENT DOCUMENTS

JP         4419354 B2      2/2010
JP         2016-61578 A    4/2016
(Continued)

OTHER PUBLICATIONS

International Search Report issued in PCT/JP2017/026063 (PCT/ISA/210), dated Oct. 24, 2017.

*Primary Examiner* — Khoi H Tran
*Assistant Examiner* — Shahzab Hussain Shah
(74) *Attorney, Agent, or Firm* — Birch, Stewart, Kolasch & Birch, LLP (57) ABSTRACT

An object is to provide a technique capable of appropriately notifying a driver of information on an estimated destination even when the estimated destination is relatively far from the current position. The notification control apparatus includes an acquisition unit and a control unit. The acquisition unit acquires passage probability information and current position information. The control unit makes the notification unit notify of a content within a range defined by a distance previously associated with a probability of the passage probability information and a current position of the current position information based on the passage probability information and the current position information acquired by the acquisition unit.

9 Claims, 4 Drawing Sheets

(56) References Cited

U.S. PATENT DOCUMENTS

| | | | |
|---|---|---|---|
| 10,327,034 B2 * | 6/2019 | Shen | H04N 21/2353 |
| 10,780,884 B2 * | 9/2020 | Masui | G05D 1/0246 |
| 2008/0027637 A1 * | 1/2008 | Sakano | G01C 21/367 |
| | | | 701/533 |
| 2008/0228388 A1 * | 9/2008 | Tauchi | G01C 21/36 |
| | | | 701/533 |
| 2011/0196601 A1 * | 8/2011 | Miura | G01C 21/3697 |
| | | | 701/532 |
| 2013/0147842 A1 * | 6/2013 | Zhu | G09G 5/377 |
| | | | 345/636 |
| 2015/0300836 A1 * | 10/2015 | Mizuno | G01C 21/3697 |
| | | | 701/533 |

FOREIGN PATENT DOCUMENTS

| | | |
|---|---|---|
| JP | 6091719 B2 | 3/2017 |
| WO | WO 2016/030986 A1 | 3/2016 |

* cited by examiner

FIG. 3

GENERAL ROAD

| DISTANCE OF INFORMATION PROVIDING RANGE /PASSAGE PROBABILITY OF MAP AREA | INFORMATION PROVIDING RANGE /PASSAGE PROBABILITY OF ROAD LINK |
|---|---|
| 5km/80% OR MORE | 10 km/80% OR MORE |
| 2.5km/60% OR MORE | 5.0 km/60% OR MORE |
| 1.0km/50% OR MORE | 2.5 km/50% OR MORE |

HIGHWAY

| INFORMATION PROVIDING RANGE /PASSAGE PROBABILITY OF ROAD LINK |
|---|
| 20 km/80% OR MORE |
| 10 km/60% OR MORE |
| 5 km/50% OR MORE |

NOTIFICATION CONTROL APPARATUS AND NOTIFICATION CONTROL METHOD

TECHNICAL FIELD

The present invention relates to a notification control apparatus and a notification control method capable of controlling a notification unit.

BACKGROUND ART

In a navigation device, a technique has been proposed for predicting (estimating) a destination even if the destination of the vehicle is not set by a driver. For example, in Patent Document 1, a navigation device has been proposed which includes a prediction target area calculation means that calculates an area in the traveling direction as a prediction target area, and determines whether to calculate the prediction target area from changes in the current position and the traveling direction of the vehicle. Also, although in the regular navigation device, the prediction target area changes frequently when the traveling direction changes in a short time, etc., in the navigation device of Patent Document 1, notification of unnecessary information to the driver is suppressed by suppressing such a change.

As another technique, for example, in Patent Document 2, when the travel distance to the predicted destination becomes less than 5 km, or the travel time to the predicted destination becomes less than 10 minutes, short-distance travel information thereof is output. Then, when the predicted destination is close to the current position, the cooling set temperature is automatically changed thereby realizing energy saving for the vehicle air conditioning system. Alternatively, when the predicted destination is close to the current position, the audio device is set such that content such as video or music that has a longer reproduction time than the traveling time is not reproduced.

PRIOR ART DOCUMENTS

Patent Documents

[Patent Document 1] Japanese Patent No. 4419354
[Patent Document 2] Japanese Patent Application Laid-Open No. 2016-061578

SUMMARY

Problem to be Solved by the Invention

According to the technique of Patent Document 1, when the intended destination of the driver or the like is a place along the road the vehicle is currently traveling, guidance intended by the driver can be provided. However, when the destination intended by the driver is far away, the above-described guidance cannot be provided because the destination is not necessarily located along the road the vehicle is currently traveling. The technique of Patent Document 2 can only provide guidance when the predicted destination is relatively close to the current position, and as with Patent Document 1, guidance cannot be provided when the intended destination of the driver is far away.

As a result, in the related art, there has been a problem in that, when an estimated destination which is estimated as the destination of the vehicle is relatively far from the current position, information about the estimated destination cannot be notified appropriately.

Therefore, the present invention has been made in view of the above problems, and an object thereof is to provide a technique capable of appropriately notifying the driver of information on the estimated destination even when the estimated destination is relatively far from the current position.

Means to Solve the Problem

According to the present invention, a notification control apparatus capable of controlling a notification unit, includes, an acquisition unit configured to acquire passage probability information indicating a probability that a vehicle passes by a passage object, and acquire current position information regarding a current position of the vehicle, the passage object being predicted to be passed by the vehicle before the vehicle reaches to an estimated destination which is estimated as a destination of the vehicle, the passage object corresponding to at least any one of an area and a road link on a map, and a control unit configured to make the notification unit notify of a content within a range defined by a distance previously associated with a probability of the passage probability information and a current position of the current position information based on the passage probability information and the current position information acquired by the acquisition unit.

Effects of the Invention

According to the present invention, the notification unit is made to notify of the content within the range defined by the distance previously associated with the probability of the passage probability information and the current position of the current position information based on the passage probability information and the current position information acquired by the acquisition unit. Therefore, appropriately notifying the driver of information on the estimated destination is ensured even when the estimated destination is relatively far from the current position.

The objects, features, aspects and advantages of the present invention will become more apparent from the following detailed description of the present invention when taken in conjunction with the accompanying drawings.

DESCRIPTION OF EMBODIMENT(S)

Embodiment 1

Figure 1:
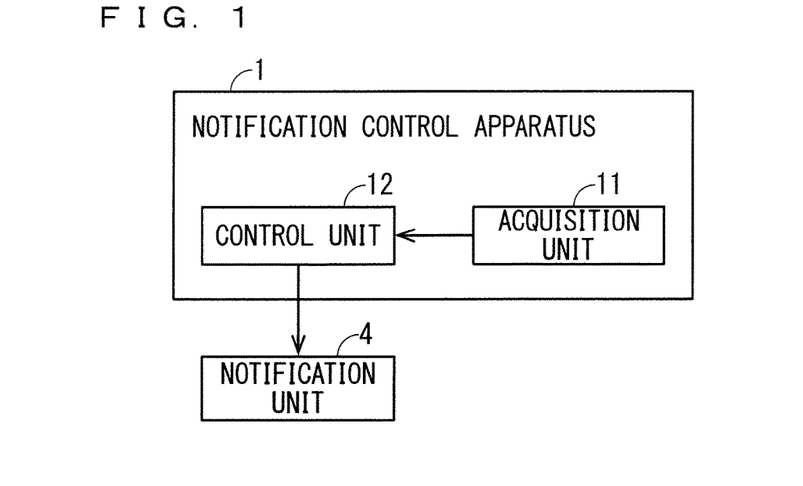
FIG. 1 A block diagram illustrating a configuration of a notification control apparatus according to Embodiment 1.

FIG. 1 is a block diagram illustrating a configuration of a notification control device 1 according to Embodiment 1 of the present invention. The notification control apparatus 1 in FIG. 1 is communicably connected to a notification unit 4 that is mountable on a vehicle, and controls the notification unit 4 by the communication. Hereinafter, the vehicle on which the notification unit 4 is mounted and which is an object of attention will be described as "subject vehicle".

The notification unit 4 notifies a vehicle user, for example, a driver of various information under the control of the notification control apparatus 1. The notification unit 4 includes, for example, at least one of a display unit such as a liquid crystal display or a head-up display (HUD) and an audio output unit such as a speaker.

Next, before describing each component of the notification control apparatus 1 in detail, the terms "estimated destination" and "passage object" used in the following description will be described.

The estimated destination is not the destination set by the driver, but the destination estimated as the destination of the subject vehicle.

The passage object, which is an object by which is predicted to be passed from the current position or the like by the subject vehicle before the subject vehicle reaches to the estimated destination, corresponds to at least any one of a map area that is an area on the map and a road link that is a link on the map. The map area is an area on map data used in a car navigation device or a map display tool, and is an area having a certain area called a mesh or tile. A road link is a data unit indicating a road on map data, and is a line segment or a curve connected by points called nodes. Generally, a unique identification number is assigned to a road link and used for route search and guidance in a car navigation device or the like.

Next, each component of the notification control apparatus 1 will be described in detail. The notification control apparatus 1 in FIG. 1 includes an acquisition unit 11 and a control unit 12.

The acquisition unit 11 acquires passage probability information indicating a passage probability that is a probability that the subject vehicle passes by the passage object. The acquisition unit 11 may acquire the passage probability information from a device external to the notification control apparatus 1, or may acquire the passage probability information by the acquisition unit 11 per se generating the passage probability information.

The acquisition unit 11 also acquires current position information regarding the current position of the subject vehicle. The acquisition unit 11 may acquire the current position information from a device external to the notification control apparatus 1, or may acquire the current position information by the acquisition unit 11 per se generating the current position information, when the acquisition unit 11 has a Global Positioning System (GPS) device.

Based on the passage probability information and the current position information acquired by the acquisition unit 11, the control unit 12 obtains a range defined by a distance previously associated with the passage probability of the passage probability information and a current position of the current position information. In the following description, this range is referred to as "information providing range".

Then, the control unit 12 makes the notification unit 4 notify of the content within the obtained information providing range.

Gist of Embodiment 1

According to the notification control apparatus 1 of Embodiment 1, the notification unit 4 is made to notify of the content within a range defined by a distance previously associated with the passage probability of the passage probability information and the current position of the current position information. Thus, even when the estimated destination is relatively far from the current position, by appropriately setting the distance previously associated with the passage probability, the content corresponding to the passage object is notified not too frequently to bother the driver. Accordingly, information on the estimated destination can be appropriately notified to the driver.

Embodiment 2

Figure 2:
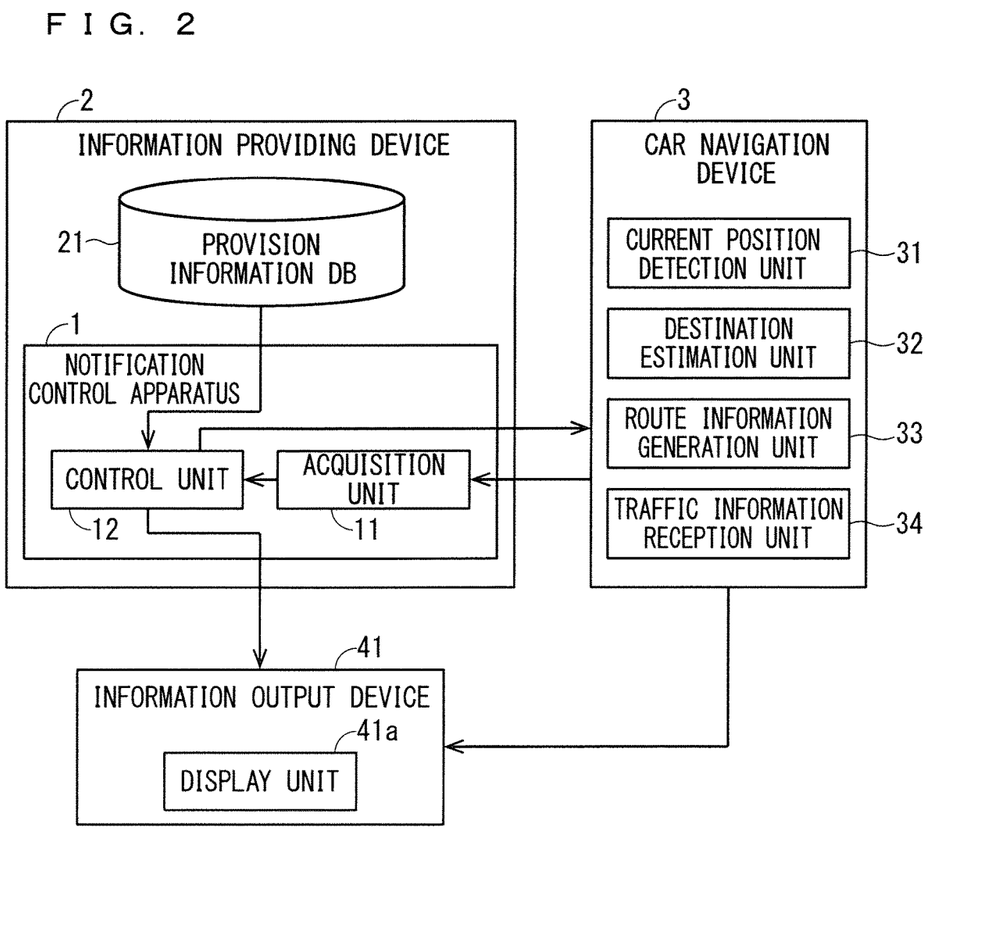
FIG. 2 A block diagram illustrating a configuration of a notification control apparatus according to Embodiment 2.

FIG. 2 is a block diagram illustrating a configuration of a notification control apparatus 1 according to Embodiment 2 of the present invention. Hereinafter, among components to be described in Embodiment 2, the same reference numerals are given to the components that are the same as or similar to the above-described components, and different components will mainly be described.

The notification control apparatus 1 of Embodiment 2 is provided in an information providing device 2 mounted on a subject vehicle, and the information providing device 2 is connected to a car navigation device 3 so as to be communicable. Although in the example of FIG. 2, the information providing device 2 and the car navigation device 3 are separate devices, the information providing device 2 and the car navigation device 3 may be provided in one device.

By using the function of the notification control apparatus 1, the information providing device 2 in FIG. 2 can control the information output of the information output device 41 based on the information from the car navigation device 3. The information output device 41 corresponds to the notification unit 4 (FIG. 1) of Embodiment 1. In Embodiment 2, the information output device 41 includes a display unit 41a, and the notification control apparatus 1 and the information providing device 2 can control the display of the display unit 41a.

<Car Navigation Device>

The car navigation device 3 in FIG. 2 includes a current position detection unit 31, a destination estimation unit 32, a route information generation unit 33, and a traffic information reception unit 34.

The current position detection unit 31 includes a GPS device, for example, and detects the current position of the subject vehicle to generate current position information. In Embodiment 2, the current position information includes the latitude and longitude corresponding to the current position of the subject vehicle, an ID for the map area corresponding to the current position of the subject vehicle, an ID for the road link on the map corresponding to the current position of the subject vehicle, and a road attribute (for example, a general road, a highway, etc.) that is an attribute for the road corresponding to the current position of the subject vehicle.

The destination estimation unit 32 estimates the destination as the estimated destination. Hereinafter, as an example of estimation in the destination estimation unit 32, a configuration using the estimation disclosed in the prior art document (WO2016/030986) will be described.

In such a configuration, the current position information generated by the current position detection unit 31 and map data, an area history, and a link history stored in a storage device (not shown) of the car navigation device 3 are used. The area history is accumulated information of past destinations to which the subject vehicle had traveled in the past via the map area for each map area. The link history is accumulated information of past destinations to which the subject vehicle had traveled in the past via the road link for each road link.

The destination estimation unit 32 estimates a value related to a travel probability to the past destination as an area estimation value based on the current position information, the map data, the area history, and the link history. The destination estimation unit 32 estimates a value related to a travel probability to the past destination as a link estimation value based on the current position information, the map data, the area history, and the link history. Then, the destination estimating unit 32 estimates the name and position (for example, latitude and longitude) of the destination as the estimated destination based on the area estimation value and the link estimation value.

According to such estimation, data indicating the estimated destination, the travel probability that the subject vehicle heads to the estimated destination, the travel probability of at least one of the area and the link presenting to the estimated destination of the subject vehicle are derived. The estimated destination can be referred to as a destination candidate, and the travel probability can be referred to as a correct answer rate.

The destination estimation unit 32 may be configured to derive data indicating the estimated destination and the travel probability for each travel date and time. According to such a configuration, for example, when the subject vehicle enters the map area A1 at 8 A.M., data indicating that the subject vehicle heads to the estimated destination D1 with a travel probability X %, and the subject vehicle heads to the estimated destination D2 with a travel probability Y % is derived. Alternatively, for example, when the subject vehicle enters the road link L1 at 1 P.M., data indicating that the subject vehicle heads to the estimated destination D1 with a travel probability Z %, and the subject vehicle heads to the estimated destination D2 with a travel probability W % is derived.

According to the above destination estimation unit 32, a point far from the current position of the subject vehicle can be derived as the estimated destination after the engine of the subject vehicle is started or the like. Further, when the subject vehicle takes a detour and travels, for the first time, on a road that the subject vehicle does not usually take, even if the estimated destination cannot be derived from the road link indicating the detour, the estimated destination can be derived from the map area.

Note, the travel probability corresponds to the passage probability described in Embodiment 1, and the data indicating the estimated destination and the travel probability corresponds to the passage probability information described in Embodiment 1. That is, in Embodiment 2, passage probability information is generated by the destination estimation unit 32.

When the destination is set by the driver, the route information generation unit 33 generates route information indicating the route to the destination based on the destination set by the driver. When the destination is not set by the driver, the route information generation unit 33 generates route information indicating the route to the estimated destination based on the estimated destination derived by the destination estimation unit 32.

The traffic information reception unit 34 receives traffic information including a place where a travel obstacle that hinders the traveling of the subject vehicle such as a congested place, a construction site, an area in which speed is regulated, and a place at which a traffic accident has occurred occurs from the Vehicle Information and Communication System (VICS) (registered trademark) or the like. For example, an entrance of a highway is assumed as a congested place. The place where a travel obstacle occurs includes, for example, a section indicated by latitude and longitude, or a section indicated by a road link ID.

<Information Providing Device>

The information providing device 2 includes a notification control apparatus 1 and a provision information database (DB) 21.

The provision information DB 21 stores facility information such as a predetermined facility name and its location, Point of Interest (POI) information of a predetermined POI, and range information that is information on an information providing range.

Figure 3:
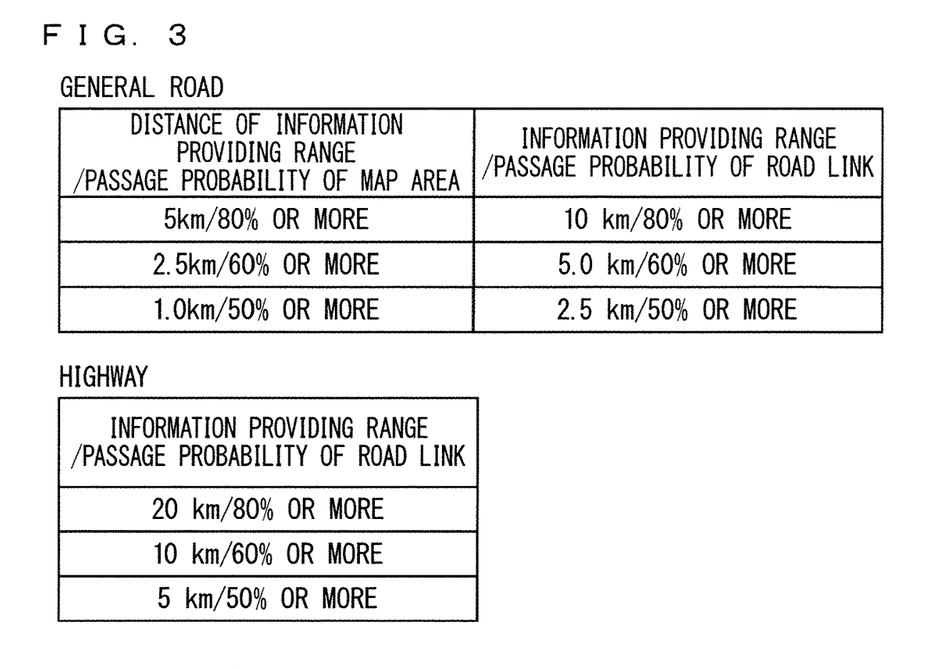
FIG. 3 A diagram illustrating range information according to Embodiment 2.

FIG. 3 is a diagram illustrating range information according to Embodiment 2. In the range information in FIG. 3, the passage probability and the distance of the information providing range are associated in advance. Also in the range information in FIG. 3, the distance of the information providing range is associated in advance with the passage probability of the passage probability information for each road attribute of the road link. Further, in the range information of FIG. 3, the passage probability and the distance of the information providing range are associated in advance so that the distance of the information providing range increases as the passage probability of the passage probability information increases.

It should be noted that, the provision information DB 21 includes, for example, a non-volatile memory such as a flash Read Only Memory (ROM) or a storage device such as an SD card, a Hard Disk Drive (HDD), or a Solid State Device (SSD). One storage device may be used for the provision information DB 21 and the storage device of the car navigation device 3.

The notification control apparatus 1 includes an acquisition unit 11 and a control unit 12 as in Embodiment 1.

The acquisition unit 11 acquires current position information, passage probability information, route information, and traffic information from the car navigation device 3 as needed.

The acquisition unit 11 acquires the current position information at a certain period, for example, at intervals of 100 milliseconds. If the period is a relatively long time such as a several tens of seconds, the moving distance and the current position of the subject vehicle are required to be estimated during that period, accordingly, the period is desirably a relatively short time.

Further, the acquisition unit 11 acquires the passage probability information and the route information, for example, when the estimated destination is changed in the car navigation device 3 or when the subject vehicle travels a certain distance.

The control unit 12 obtains the information providing range according to the range information stored in the provision information DB 21 based on the passage probability information and the current position information acquired by the acquisition unit 11. In Embodiment 2, the control unit 12 obtains, as an information providing range, a circular range which has a radius being a distance associated with the passage probability of the passage probability information in the range information and has a center being the current position of the current position information. In Embodiment 2, when the passage object corresponds to a road link, that is, when the passage probability information indicates the passage probability of the road link, the distance of the information providing range is changed based on the road attribute of the road link.

Here, an example in which the control unit 12 obtains the information providing range will be described using the range information of FIG. 3. When the passage probability information acquired by the acquisition unit 11 indicates "the passage probability of the road link is 80%" and the road attribute included in the current position information acquired by the acquisition unit 11 indicates "general road", the control unit 12 obtains an information providing range having a distance of 10 km. When the passage probability information acquired by the acquisition unit 11 indicates "the passage probability of the road link is 80%" and the road attribute included in the current position information acquired by the acquisition unit 11 indicates "highway", the control unit 12 obtains an information providing range having a distance of 20 km. When the passage probability information acquired by the acquisition unit 11 indicates "the passage probability of the map area is 60%" and the road attribute included in the current position information acquired by the acquisition unit 11 indicates "general road", the control unit 12 obtains an information providing range having a distance of 2.5 km. When the passage probability information acquired by the acquisition unit 11 indicates "the passage probability of the map area is 60%" and "the passage probability of the road link is 80%" and the road attribute included in the current position information acquired by the acquisition unit 11 indicates "general road", the control unit 12 obtains an information providing range having a greater distance (10 km) between the map area having a distance of (2.5 km) and the road link having a distance of (10 km).

Based on the information providing range obtained by the control unit 12, the route information and traffic information obtained by the acquisition unit 11, and the facility information stored in the provision information DB 21, the control unit 12 makes a display unit 41*a* display a content within the information providing range.

For example, the control unit 12 determines whether or not the position of the travel obstacle included in the traffic information is within the information providing range based on the information providing range and the traffic information. When the control unit 12 determines that the position of the travel obstacle is within the information providing range, the control unit 12 determines that the content is within the information providing range, and makes the display unit 41*a* display the above traffic information as the content within the information providing range.

Further, the control unit 12 determines whether or not the position of the travel obstacle included in the traffic information is within the information providing range and is within a predetermined distance (100 m for example) from sides of a route of the route information or from the route, based on the information providing range, the route information, and the traffic information. Then, when the control unit 12 determines that the position of the travel obstacle is within the range and within the distance, the control unit 12 determines that the content is within the information providing range, and makes the display unit 41*a* display the above traffic information as the content within the information providing range.

Further, the control unit 12 determines whether or not the position of the predetermined facility included in the facility information is within the information providing range and is within a predetermined distance (100 m for example) from sides of a route of the route information or from the route, based on the information providing range, the route information, and the facility information. Then, when the control unit 12 determines that the predetermined facility is within the range and within the distance, the control unit 12 determines that the content is within the information providing range, and makes the display unit 41*a* display the above facility information as the content within the information providing range.

As a result, the content displayed on the display unit 41*a* in Embodiment 2 includes the traffic information, route surrounding facility information that is information on a predetermined facility that is not located on either side of the route on which the subject vehicle travels, and roadside facility information that is information on predetermined facilities located on sides of the route on which the subject vehicle travels. However, the content is not limited thereto, and may include at least one of the traffic information, the route surrounding facility information, and the roadside facility information.

The display unit 41*a* according to Embodiment 2 displays a map at any one of a plurality of stages of scale (for example, 10 stages) under the control of the control unit 12. When the content is outside the range of the map displayed on the display unit 41*a*, the control unit 12 changes the scale of the map, that is, the display size.

<Operation>

Figure 4:
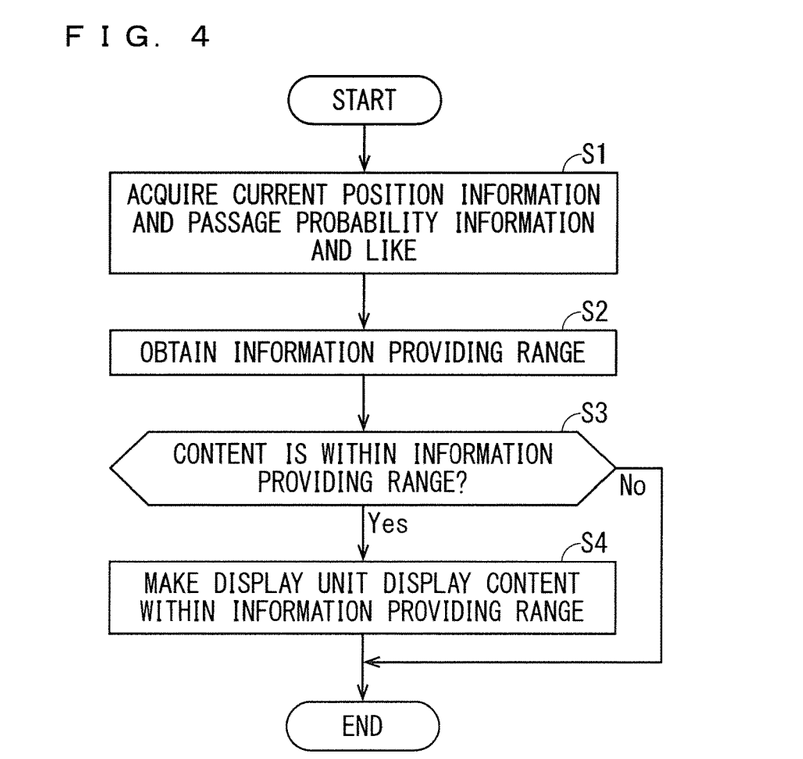
FIG. 4 A flowchart illustrating an operation of the notification control apparatus according to Embodiment 2.

FIG. 4 is a flowchart illustrating an operation of the notification control apparatus 1 according to Embodiment 2.

In Step S1, the acquisition unit 11 acquires the current position information, the passage probability information, the route information, and the traffic information from the car navigation device 3. Note that the process of Step S1 is performed as needed, and accordingly, the processes after Step S2 are also performed as needed.

In Step S2, the control unit 12 obtains the information providing range based on the passage probability information and the current position information acquired by the acquisition unit 11.

In Step S3, the control unit 12 determines whether or not the content is within the information providing range based on the obtained information providing range, the route information and traffic information obtained by the obtaining unit 11, and the facility information stored in the provision information DB 21. If it is determined that there is content, the process proceeds to Step S4, whilst if it is determined that there is no content, the processes in FIG. 4 end.

In Step S4, the control unit 12 makes the display unit 41*a* display the content within the information providing range. Thereafter, the processes in FIG. 4 end.

Gist of Embodiment 2

According to the notification control apparatus 1 according to Embodiment 2 as described above, the content includes the traffic information, the route surrounding facility information, and the roadside facility information; therefore, the notification control apparatus 1 can notify the driver of information such as the traffic information and the facility information that the driver should grasp before changing the route. Accordingly, the information on the estimated destination can be appropriately notified to the driver.

In Embodiment 2, the distance of the information providing range is changed based on the road attribute of the road link; therefore, information on the estimated destination can be notified to the driver more appropriately.

In Embodiment 2, when the content is outside the range of the map displayed on the display unit 41a, the scale of the map is changed. According to such a configuration, the display unit 41a can be made to display the content automatically without the driver performing an operation of changing the scale of the map.

Modification 1 of Embodiment 2

Between Step S1 and Step S2 in FIG. 4, the control unit 12 may determine whether or not the passage probability of the passage probability information is equal to or higher than a predetermined threshold (for example, 50%). Then, the process may proceed to Step S2 when it is determined that the passage probability is equal to or higher than the threshold, and the processes in FIG. 4 may end when it is determined that the passage probability is smaller than the threshold.

That is, the control unit 12 may determine whether or not the passage probability of the passage probability information is smaller than the threshold value, and perform control not to make the display unit 41a display the content when the passage probability of the passage probability information is smaller than the threshold. According to such a configuration, when the passage probability is relatively low, that is, when the necessity of notifying the content is low, the process for obtaining the information providing range and the content notification process are suppressed. As a result, power consumption required by these processes can be reduced.

Similarly, the route information generation unit 33 of the car navigation device 3 may be configured not to generate the route information when the passage probability of the passage probability information is smaller than the threshold. According to such a configuration, reduction in power consumption associated with generation of route information is ensured.

Modification 2 of Embodiment 2

The control unit 12 may determine whether or not a difference between the stage of the scale of the map after the scale is changed and the stage of the scale of the map before the scale is changed is equal to or higher than a predetermined threshold (for example, three stages). Then, when the control unit 12 determines that the above difference is equal to or higher than the threshold, after making the display unit 41a display the map after the scale is changed for a predetermined time (for example, several seconds), the control unit 12 may make the display unit 41a display the original map, that is, the map before the scale is changed. Meanwhile, when it is determined that the difference is smaller than the threshold value, the control unit 12 may make the display unit 41a continue to display the map after the scale is changed.

According to such a configuration, the display unit 41a can be made to display the content while maintaining the scale of the map before the scale is changed as much as possible.

Modification 3 of Embodiment 2

When the estimated destination is within the range of the map displayed on the display unit 41a, the control unit 12 may make the display unit 41a display a POI between the estimated destination and the current position of the current position information among the POIs indicated by POI information stored in the provision information DB 21. According to such a configuration, when the distance between the current position and the estimated destination is short enough that the estimated destination is displayed on the display unit 41a, the driver is notified of a POI that should be notified in advance. According to the distance between the current position and the estimated destination, the driver is notified of a POI that should be notified in advance.

Modification 4 of Embodiment 2

In Steps S3 and S4 of FIG. 4, when the route to the estimated destination crosses different road attributes, for example, when the road attribute changes from a general road to a highway and then the road attribute changes from a highway to a general road, the control unit 12 may preferentially select the traffic information in the crossing range from the contents within the information providing range and may make the display unit 41a display thereof. The display may be combined with Modification 2 of Embodiment 2.

According to such a configuration, early notification to the user of congestion that may occur in the vicinity of area where a general road leads to a highway or of congestion that occurs in the vicinity of toll gate exit where a highway leads to a general road is ensured.

Modification 5 of Embodiment 2

In Steps S3 and S4 of FIG. 4, a method of displaying specific content within the information providing range, such as a POI including a convenience store, a restaurant, etc. may be changed in accordance with presence or absence of a parking lot, whether or not a restaurant is drive-through, and within business hours or not. The above information such as the presence or absence of a parking lot may be stored in the provision information DB 21 together with the specific content.

For example, for a convenience store with a parking lot, a P mark may be displayed by an icon of the convenience store. Similarly, a mark indicating drive-through may be displayed by an icon of a restaurant with drive-through. Similarly, by changing the color of an icon depending on whether the current time is within business hours, the user may be notified of whether the facility of the icon is currently open.

By doing this, a user can learn information available in advance; therefore, occurrence of the situation where the driver of a car heads to a convenience store without a parking lot can be reduced, for example. The provision information DB 21 may be on a server 51 described later, or the provision information DB 21 may be updated from the server 51.

Modification 6 of Embodiment 2

In Modification 5 of Embodiment 2, in the case where specific content within the information providing range, for example, POIs of a convenience store, a restaurant, etc., does not satisfy specific conditions (for example, there is a parking lot), the control unit 12 may make the display unit 41a display contents within a predetermined range (for example, 200 m range) centered on the specific content and contents that solve the specific conditions (POI with a parking lot, for example).

By doing this, when there is no parking lot in the destination the user wishes to visit or the place the user wishes to drop in, search operation of a place with a parking lot is eliminated and convenience is improved.

Other Modification

Figure 5:
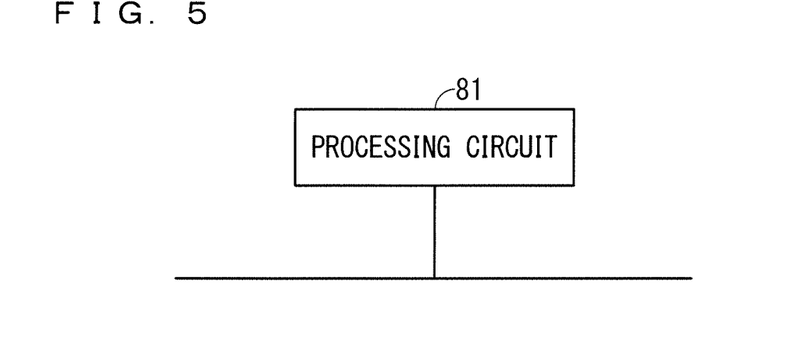
FIG. 5 A block diagram illustrating a hardware configuration of a navigation device according to another Modification.

The acquisition unit 11 and the control unit 12 in FIG. 1 in the notification control apparatus 1 described above are hereinafter referred to as "acquisition unit 11 and so forth". The acquisition unit 11 and so forth are realized by a processing circuit 81 illustrated in FIG. 15. That is, the processing circuit 81 includes an acquisition unit 11 acquires passage probability information and current position information, and a control unit 12 makes the notification unit 4 notify of the content within the information providing range based on the passage probability information and current position information acquired by the acquisition unit 11. Dedicated hardware may be applied to the processing circuit 81, or a processor that executes a program stored in a memory may also be applied thereto. The processor corresponds to, for example, a central processing unit, a processing unit, an arithmetic unit, a microprocessor, a microcomputer, a Digital Signal Processor (DSP), or the like.

In a case where the processing circuit 81 is dedicated hardware, the processing circuit 81 includes, for example, a single circuit, a composite circuit, a programmed processor, and a parallel programed processor, an Application Specific Integrated Circuit (ASIC), and a Field Programmable Gate Array (FPGA), or a combination thereof. Each function of the acquisition unit 11 and so forth may be realized by a circuit in which processing circuits are distributed, or the function of each unit may be realized by a single processing circuit, comprehensively.

Figure 6:
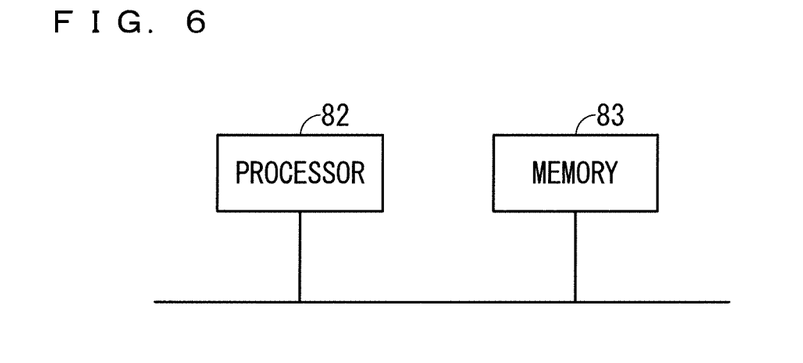
FIG. 6 A block diagram illustrating a hardware configuration of a navigation device according to another Modification.

If the processing circuit 81 is a processor, the functions of the acquisition unit 11 and so forth are realized by a combination with software or the like. Note that the software or the like corresponds to, for example, software, firmware, or software and firmware. Software or the like is described as a program and stored in a memory 83. As illustrated in FIG. 6, a processor 82 applied to the processing circuit 81 reads out and executes the program stored in the memory 83, thereby realizing the function of each unit. That is, the notification control apparatus 1 includes the memory 83 for storing a program which, when executed by the processing circuit 81, executes, eventually, a step of acquiring the passage probability information and the current position information and a step of making the notification unit 4 notify of the content within the information providing range based on the passage probability information and current position information that have been acquired. In other words, it can be said that this program causes a computer to execute a procedure and method of the acquisition unit 11 and so forth. Here, the memory 83 may be a non-volatile or volatile semiconductor memory such as a Random Access Memory (RAM), a Read Only Memory (ROM), a flash memory, an Erasable Programmable Read Only Memory (EPROM), an Electrically Erasable Programmable Read Only Memory (EEPROM), or the like, a Hard Disk Drive (HDD), a magnetic disk, a flexible disk, an optical disk, a compact disk, a mini disk, a Digital Versatile Disc (DVD) and a drive device therefor or the like, or any storage media to be used in the future.

The configuration in which each function of the acquisition unit 11 and so forth is realized by either hardware or software has been described above. However, the present invention is not limited thereto, and a configuration in which one part of the acquisition unit 11 and so forth is realized by dedicated hardware and another part is realized by software or the like. For example, the acquisition unit 11 can have its function realized by the processing circuit 81 and a receiver or the like as dedicated hardware, and the processing circuit 81 as the processor 82 can have function for the other part realized by reading out and executing the program stored in the memory 83.

As described above, the processing circuit 81 can realize the functions described above by hardware, software, or the like, or a combination thereof.

The notification control apparatus 1 described above can also be applied to a notification control system constructed as a system by appropriately combining a navigation device such as a Portable Navigation Device (PND), a mobile phone, a communication terminal including a mobile terminal such as a smartphones and a tablet, a function of an application installed in at least one of the navigation device and the communication terminal, and a server. In this case, each function or each component of the notification control apparatus 1 described above may be distributed and arranged in each device that constructs the system, or may be integrated into any device. For example, the notification control apparatus may further include the notification unit 4 in FIG. 1. For example, a configuration may be applicable in which the server has a navigation function, and the navigation device has only a display function and a position detection function.

Figure 7:
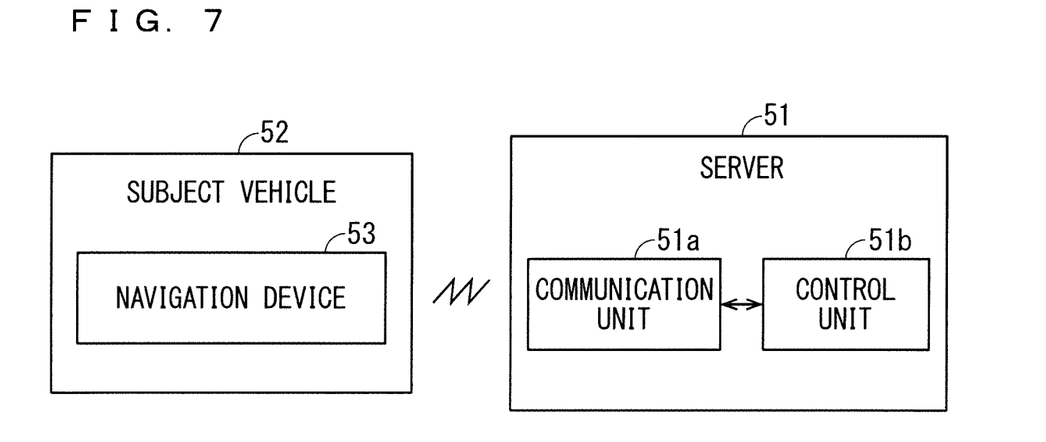
FIG. 7 A block diagram illustrating a configuration of a server according to another Modification.

FIG. 7 is a block diagram illustrating a configuration of a server 51 according to present Modification. The server 51 in FIG. 7 includes a communication unit 51a and a control unit 51b, and can perform wireless communication with the navigation device 53 of a subject vehicle 52.

The communication unit 51a as an acquisition unit receives passage probability information and current position information acquired by the navigation device 53 by performing wireless communication with the navigation device 53.

The control unit 51b has a function similar to that of the control unit 12 in FIG. 1 by a processor (not illustrated) of the server 51 or the like executing a program stored in a memory (not illustrated) of the server 51. That is, the control unit 51b obtains the information providing range based on the passage probability information and the current position information received by the communication unit 51a. Then, the control unit 51b generates control information for making the notification unit 4 notify of the content within the information providing range. The communication unit 51a transmits the control information generated by the control unit 51b to the navigation device 53.

According to the server 51 configured as described above, the same effect as that of the notification control apparatus 1 described in Embodiment 1 can be obtained.

Figure 8:
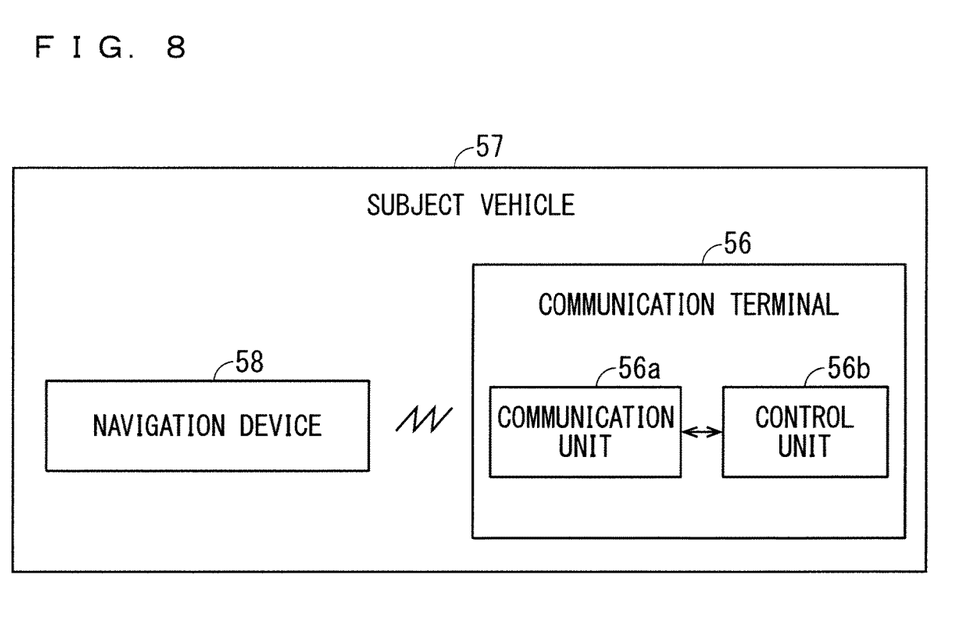
FIG. 8 A block diagram illustrating a configuration of a communication terminal according to another Modification.

FIG. 8 is a block diagram illustrating a configuration of a communication terminal 56 according to present Modification. The communication terminal 56 in FIG. 8 includes a communication unit 56a similar to the communication unit 51a and a control unit 56b similar to the control unit 51b, and can perform wireless communication with the navigation device 58 of a subject vehicle 57. As the communication terminal 56, for example, a mobile terminal such as a mobile phone, a smartphone, and a tablet carried by the driver of the subject vehicle 57 is applied. According to the server 56 configured as described above, the same effect as that of the notification control apparatus 1 described in Embodiment 1 can be obtained.

It should be noted that Embodiments and Modifications of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS

1 notification control apparatus, 4 notification unit, 11 acquisition unit, 12 control unit, 41*a* display unit

The invention claimed is:

1. A notification control apparatus capable of controlling a notification device, comprising:
   a receiver configured to acquire passage probability information indicating a probability that a vehicle passes by a passage object, and acquire current position information regarding a current position of the vehicle, the passage object being predicted to be passed by the vehicle before the vehicle reaches to an estimated destination which is estimated as a destination of the vehicle, the passage object corresponding to at least any one of an area and a road link on a map, and
   a controller configured to make the notification device notify of a content within a range defined by a distance previously associated with the probability of the passage probability information and the current position of the current position information based on the passage probability information and the current position information acquired by the receiver,
   wherein the distance previously associated is changed by the probability of the passage probability information.

2. The notification control apparatus according to claim 1, wherein the content includes at least one of traffic information, information on a predetermined facility that is not located on sides of a route on which the vehicle travels, and information on a predetermined facility that is located on sides of a route on which the vehicle travels.

3. The notification control apparatus according to claim 1, wherein
   the distance is previously associated with the probability of the passage probability information for each road attribute of the road link, and
   when the passage object corresponds to the road link, the controller is configured to change the distance of the range based on the road attribute of the road link.

4. The notification control apparatus according to claim 1, wherein
   the notification device includes a display device configured to display the map at any one of a plurality of stages of scale, and
   when the content is outside the range of the map displayed on the display device, the controller is configured to change the scale of the map.

5. The notification control apparatus according to claim 4, wherein when a difference between a stage of a scale of the map after the scale is changed and a stage of a scale of the map before the scale is changed is equal to or higher than a predetermined threshold, after making the display device display the map after the scale is changed for a predetermined time, the controller is configured to make the display device display the map before the scale is changed.

6. The notification control apparatus according to claim 1, wherein
   the notification device includes a display device configured to display the map, and
   when the estimated destination is within the range of the map displayed on the display device, the controller is configured to make the display device display a Point Of Interest (POI) between the estimated destination and the current position of the current position information.

7. The notification control apparatus according to claim 1, wherein when the passage probability of the passage probability information acquired by the receiver is smaller than a predetermined threshold, the controller is configured not to make the notification device notify of the content.

8. A notification control method capable of controlling a notification device, the notification control method comprising:
   acquiring passage probability information indicating a probability that a vehicle passes by a passage object, and acquiring current position information regarding a current position of the vehicle, the passage object being predicted to be passed by the vehicle before the vehicle reaches to an estimated destination which is estimated as a destination of the vehicle, the passage object corresponding to at least any one of an area and a road link on a map, and
   making the notification device notify of a content within a range defined by a distance previously associated with the probability of the passage probability information and the current position of the current position information based on the acquired passage probability information and the current position information,
   wherein the distance previously associated is changed by the probability of the passage probability information.

9. The notification control apparatus according to claim 1, wherein the range is a circular range which has a radius being the distance previously associated and has a center being the current position of the current position information.

* * * * *